United States Patent [19]

Kudo et al.

[11] Patent Number: 4,467,064

[45] Date of Patent: Aug. 21, 1984

[54] METHOD OF MANUFACTURING POLYESTER FIBERS WITH GOOD ADHESION TO RUBBER

[75] Inventors: Kazushige Kudo, Joyo; Shigeo Yamamoto, Uji; Shigemitsu Murase, Joyo, all of Japan

[73] Assignee: Unitika Ltd., Osaka, Japan

[21] Appl. No.: 317,666

[22] Filed: Nov. 2, 1981

[30] Foreign Application Priority Data

Nov. 11, 1980 [JP] Japan .................................. 55-159021

[51] Int. Cl.³ .............................................. C08K 5/15
[52] U.S. Cl. .................................... 524/114; 525/480
[58] Field of Search ................................ 524/114, 481

[56] References Cited

U.S. PATENT DOCUMENTS

| | | | |
|---|---|---|---|
| 3,437,610 | 4/1969 | Moult | 525/503 |
| 3,525,703 | 8/1970 | Iwami et al. | 525/481 |
| 3,793,130 | 2/1974 | Marzocchi | 524/114 |
| 4,210,700 | 7/1980 | Marshall et al. | 252/8.7 |

*Primary Examiner*—Joseph L. Schofer
*Assistant Examiner*—N. Sarofim

[57] ABSTRACT

This invention is a method of manufacturing polyester fibers with good adhesion to rubber, characterized in that in the process of spinning polyester fibers, a spinning oil (finish composition) containing an epoxy compound and a novolak resin made from a dimethylolated phenolic compound and resorcinol is added to the polyester fibers which are then heat treated.

11 Claims, No Drawings

METHOD OF MANUFACTURING POLYESTER FIBERS WITH GOOD ADHESION TO RUBBER

BACKGROUND OF THE INVENTION

This invention concerns a method of manufacturing polyester fibers with good adhesion to rubber, particularly by using a finish composition which contains an epoxy compound and a novolak resin made from a dimethylolated phenolic compound and resorcinol, followed by heat treatment of the polyester fibers.

Polyester fibers, such as polyethylene terephthalate, have excellent physical and chemical properties, are mass produced industrially and are widely used in various fields. They are also a very suitable material for reinforcing rubber.

However, polyester fibers have a great defect in that they are inferior in adhesion to rubber when compared to polyamide fibers such as nylon 6, nylon 6,6, etc., which are also typical industrial fibers.

Thus when polyamide fibers are simply treated with a resorcinol-formaldehyde-rubber latex (RFL) adhesive, they have good adhesion to rubber; in the case of polyester fibers, even when this RFL treatment is performed, good adhesion cannot be obtained.

For this reason, many attempts have been made to improve the adhesion of polyester fibers to rubber. Typical methods for doing this are: (1) when treating the raw cord textile with the RFL treatment (the so-called "dipping treatment"), it is first pretreated with an adhesive such as an epoxy compound, an isocyanate compound, an ethylene urea compound, etc., and then treated with RFL or RFL mixed with an esterophilic ingredient such as a novolak resin, or 2,6-bis(2',4'-dihydroxyphenylmethyl)-4-chlorophenol, known by the trade name "Pexul"; and (2) an adhesive such as an epoxy compound, an isocyanate compound, etc., is added at the yarn stage, followed by dip-treating with RFL. Although the former method does give the desired adhesion to some degree, it has defects in that it requires a large quantity of adhesive, and the treatment method is troublesome, which tends to increase the cost. Although the latter method has the practical advantage that, like the polyamide fibers, the later dip treatment can be performed with RFL alone, it has the defect that the essential adhesive function is somewhat insufficient. Consequently, particularly in the latter method, a new problem is created that, in order to increase the adhesiveness, the method of treating the yarn itself must be performed under conditions which deviate greatly from the practical range: the concentration of the adhesive used in treating the yarn is markedly increased, the heat treatment conditions are made extremely severe, etc. Many methods involving adding epoxy compounds when polyester fibers are spun are known. However, all the previous methods have defects, e.g., (as mentioned above) their adhesive ability is not sufficient, or they require severe treatment conditions which greatly exceed what is practical. Thus, they cannot be considered satisfactory.

SUMMARY OF THE INVENTION

Against such a background, this invention makes possible the manufacturing of polyester fibers with good adhesion to rubber by the very simple method of adding the adhesive at the same time the spinning oil (finish composition) is added, when the polyester fiber is spun, and then heat-treating by using the heat treatment of the subsequent drawing process, after which only RFL treatment is performed.

Thus this invention is characterized in that, in the process of spinning the polyester fiber, a spinning oil (finish composition) containing an epoxy compound and a novolak resin made from a dimethylolated phenolic compound and resorcinol is added to the polyester fiber, and it is then heat treated.

This invention solves the problems of the prior art by using an epoxy compound and a novolak resin simultaneously. In addition, by using this invention, not only is a high initial adhesive force obtained, but the permanent adhesion is also excellent, and even if the fiber is exposed to a high temperature in the rubber, the adhesive force is not decreased very much.

The phenolic compound in this invention refers to phenol ($C_6H_5OH$) or its ring substituted derivatives. Concrete examples of these ring substituted derivatives are p-chlorophenol, p-bromophenol, p-methylphenol, etc. The novolak resin is obtained by reacting formaldehyde with a phenolic compound, dimethylolating it, and reacting with excess resorcinol. Its degree of condensation is about 2–10.

The epoxy compound of this invention is ordinarily synthesized by the reaction of an epoxy compound containing a halogen, e.g., epichlorohydrin, and a polyhydric alcohol or polyhydric phenol. Examples of such polyhydric alcohols or phenols are: polyhydric alcohols such as glycerol, ethylene glycol, diethylene glycol, propylene glycol, sorbitol, polyethylene glycol, polypropylene glycol, trimethylol propane, or their derivatives; and polyhydric phenols such as resorcinol, catechol, hydroquinone, or their derivatives. One may also use cyclohexane epoxide, diglycidyl ether, etc., obtained by oxidizing the unsaturated bonds with peracetic acid.

The spinning oil (finish composition) used in this invention contains, besides the epoxy compound and novolak resin, natural oils such as mineral oil, coconut oil, rapeseed oil, sperm oil, etc., or synthetic oils such as esters of higher alcohols or polyhydric alcohols and higher fatty acids, as the lubricating ingredient. Furthermore, they may contain, if desired, antistatic agents, heat-resisting agents, reaction accelerators (curing catalysts), coloring agents, etc. There is not necessarily any need to use a surfactant as an emulsifying and dispersing agent, but in general it is desirable to use a compound of castor oil or a higher alcohol to which an alkylene oxide has been added, polyethylene glycol, or an ester of polyethylene glycol and a higher fatty acid, etc. Of course, such a surfactant can also be the emulsifying and dispersing agent of the epoxy compound and the novolak resin.

The proportion of the ingredients in the spinning oil (finish composition) should be: 5–50 weight percent epoxy compound, 3–30 weight percent novolak resin, 20–70 weight percent lubricating agent, 10–50 weight percent emulsifier, and suitable quantities of other additives to make a total of 100 weight percent.

If the proportions of the mixture are within these ranges, the original lubricating and adhering functions of the spinning oil (finish composition) will not be lost, and the increase in adhesion aimed for will be produced.

The "polyester" in this invention refers to a polycondensate of a compound with two ester-forming OH groups, typified by ethylene glycol, and a compound with two ester-forming carboxyl groups, typified by terephthalic acid; a typical example is polyethylene terephthalate. However, the polyester is not limited to homopolymers; copolymers are also possible, and compounds with three or more ester-forming groups may be used as copolymer ingredients, as long as they are within the range that will not hinder their fiber-forming ability.

The spinning process referred to is the process of spinning-winding-drawing-winding; of course, a spin-draw type of process, directly connecting the spinning and the drawing processes, may also be used. The spinning oil (finish composition) may be added at any desired stage of the operation by the roller, immersion, spray, or other methods. The spinning oil (finish composition) is used in the ordinary aqueous emulsion form, but it may also be used as a straight oil, diluted with low viscosity mineral oil, etc., as long as dispersion and emulsification of the adhesive is possible. The addition of the oil (finish) may be performed two or more times; it is desirable for the total quantity of oil added to be 0.2-2 weight percent. Treatment with a spinning oil (finish composition) which lacks one or both of the epoxy compounds and novolak resin may be combined with treatment with the spinning oil (finish composition) of this invention. After adding the oil, heat treatment is performed at 150°-250° C. for a period from 0.05 to several seconds. The method of heat treatment may be hot plate, hot rollers, slit heater, oven, etc. This heat treatment may correspond exactly to the drawing process, i.e., the heat treatment conditions of the drawing process will become the heat treatment conditions required by this invention, without change. Thus, this invention may be said to be extremely practical. The simplest application of the method of this invention is to use the yarn-forming oil (finish composition) of this invention itself as the spinning oil (spin finish), and then to perform the normal hot drawing treatment. Thus the composition of this invention has the great practical advantages that it can be applied as the spinning oil (spin finish) and that the severe heat treatment conditions of conventional methods are unnecessary.

Obviously, the molecular weight, denier, filament number, cross-sectional shape, properties of the yarn material, fine structure, presence or absence of additives, and polymer properties (concentration of terminal carboxyl groups, etc.) are not limited in any way.

The polyester fibers obtained by the method of this invention will have extremely good adhesion to rubber merely upon application of the normal RFL treatment, after twisting and weaving by the normal methods.

This increase in adhesion does not stop with an improvement of the polyester fiber itself, but is also directly connected with an improvement in the quality of the rubber product which is being reinforced, and thus has great practical value.

DESCRIPTION OF THE PREFERRED EMBODIMENT

This invention will be explained concretely by the actual examples given below. The measurement of intrinsic viscosity in the actual examples was performed in a mixed solvent of phenol and tetrachloroethane (1/1 weight ratio) at 20° C.

The measurement of the adhesive force with the rubber was performed by the following method: the original yarn was made into raw cord (twisting, twining together), which was made into dip cord (dip treatment), embedded in the rubber, and vulcanized, after which the adhesive force between the cord and the rubber was measured.

In this process, the raw cord was made by twisting with a ring twisting machine at 40 twists/10 cm; two of these cords were twined together in the same manner at 40 twists/10 cm.

The dip treatment was performed under the following conditions.

| Solution A | |
|---|---|
| Resorcinol | 15 parts |
| Formaldehyde | 20 parts |
| Caustic Soda | 0.4 part |
| Water | 290 parts |
| Solution B | |
| Vinyl Pyridine-Butadiene-Latex Liquid (40%) | 240 parts |
| Butadiene-Styrene Latex (40%) | 80 parts |
| Water | 347 parts |

Solution A was cured at 25° C. for 6 hours; Solution B was cured at 25° C. for 4 hours. The two solutions were mixed, and again cured at 25° C. for 12 hours.

| Dipping Conditions | |
|---|---|
| Target Adhering Quantity (Solid Part) | 5 percent |
| Drying Zone | 80° C. × 30 seconds |
| Curing Zone (2 Chambers) | 230° C. × 80 seconds × 2 times |

The method of vulcanization was as follows: in an H-test mold, the dipped cord was embedded in unvulcanized rubber, the principal ingredients of which were: 30 parts smoked sheet, 70 parts styrene-butadiene rubber, 40 parts carbon black, 5 parts zinc oxide, 1.5 parts stearic acid, 1 part phenyl-betanaphthyl amine, 0.3 part anhydrous phthalic acid, 0.8 part vulcanization accelerator, 0.15 part diphenyl guanidine, and 2 parts sulfur. The rubber was vulcanized by heating at 140° C. for 40 minutes, and the adhesive treatment was performed.

The method of measuring the adhesive force was the "H-test method": the load required to pull out the cord embedded in rubber to a depth of 1 cm was measured.

ACTUAL EXAMPLE 1

One hundred twenty parts of a spinning oil for polyester fibers, the principal ingredients of which were an aliphatic alcohol ester and a nonionic emulsifier, were emulsified in 800 parts of water to form an aqueous emulsion; 80 parts of Epicote 812 (Shell Chemical Company product; reaction product of epichlorohydrin and glycerin) were dispersed in this emulsion. Then 50 parts of a novolak resin (A) with a principal ingredient of degree of condensation 2, obtained by the reaction of a dimethylol compound of p-chlorophenol with resorcinol, were dispersed in 200 parts water with 30 parts nonionic activator; this dispersed solution was mixed with the emulsion. Thus a spinning oil (finish composition) containing an epoxy compound and a novolak resin was prepared.

Polyethylene terephthalate (PET) chips with an intrinsic viscosity of 0.95 were melted and spun with an extruder-type melt spinner, using a spinnerette with 192 holes and a discharge quantity of 450 grams/minute. The above-described spinning oil (finish composition) was applied using the ordinary oiling roller method, and the undrawn yarn was wound at 450 m/minute. The quantity of spinning oil which adhered at this time was 0.9 percent, in the solid part, with respect to the yarn weight.

Next, this undrawn yarn was fed to a two-stage drawing machine, and was treated for 0.1 second with a 210° C. hot plate and for 0.1 second with a 230° C. hot roller in the second stage drawing region. The yarn was drawn a total of 6.0 fold in the two stages. After heat-treating again on a 230° C. hot plate for 0.3 second to fix the length, the yarn was wound, and 1500 denier/192 filament PET fiber was obtained.

The adhesion to rubber of the PET fibers obtained is shown in Table 1. Three comparative examples are also shown in Table 1. Comparative Example 1 was evaluated in the same way as Actual Example 1 except that a spinning oil was used to which Epicote 812 and the novolak resin were not added; Comparative Example 2 omitted only Epicote 812 from the spinning oil; and Comparative Example 3 omitted only the novolak resin from the spinning oil.

As is clear from Table 1, Actual Example 1 of this invention was superior in adhesion compared to the Comparative Examples 1-3.

TABLE 1

|  | Adhesion (kg/cm) |
| --- | --- |
| Actual Example 1 | 17.5 |
| Comparative Example 1 | 3.8 |
| Comparative Example 2 | 8.4 |
| Comparative Example 3 | 10.5 |

ACTUAL EXAMPLES 2-5

In the spinning oil of Actual Example 1, the epoxy compound and the novolak resin were varied as shown in Table 2, and PET fibers of 1500 denier and 192 filaments were obtained in exactly the same manner as in Actual Example 1. The adhesion to rubber of the PET fibers was measured, and is also shown in Table 2.

TABLE 2

|  | Epoxy Compound | | Novolak Resin | | Adhesion (kg/cm) |
| --- | --- | --- | --- | --- | --- |
|  | Kind | Quantity | Kind | Quantity |  |
| Actual Example 2 | Epicote 812 | 30 | A | 10 | 17.2 |
| Actual Example 3 | Epicote 812 | 30 | B | 20 | 17.4 |
| Actual Example 4 | Denacol EX-421 | 40 | A | 10 | 17.6 |
| Actual Example 5 | Denacol EX-421 | 30 | B | 20 | 17.4 |
| Comparative Example 4 | Denacol EX-421 | 30 | — | 0 | 10.8 |
| Comparative Example 5 | — | 0 | B | 20 | 8.5 |

Note:
Denacol EX-421 is a trade name of Nagase and Company Ltd.; it is an epoxy compound whose principal ingredient is a triglycidyl ether of diglycerin.

Novolak resin A is the same as that of Actual Example 1; B is a resin whose principal ingredient is the reaction product of the dimethylolate of p-bromophenol and resorcinol (degree of condensation, 4).

ACTUAL EXAMPLE 6

PET of intrinsic viscosity 0.84 was spun. After treating with a straight oil (spinning oil), usually a low-viscosity mineral oil, so that the quantity adhering was 0.2 percent, the yarn was fed without winding to a two-stage drawing machine and drawn in two stages; the total drawing ratio was 6.1 fold. Then, at the point before it was fed to the final rollers, a second oil was added with the following composition: to 100 parts of a second oil whose principal ingredients were rapeseed oil and castor oil modified with ethylene oxide, were added 60 parts diglycerin triglycidyl ether, 30 parts diester of polyethylene glycol (molecular weight 400) and oleic acid, and 30 parts novolak resin A (this oil was added as a 25 percent aqueous emulsion). This second oil was added so that the quantity of the effective ingredients adhering was 0.8 percent. After passing through the final rollers at 230° C. (heat treatment time 0.1 second) and winding, a 1500 denier/192 filament PET fiber was made. For comparison, the experiment was performed with the novolak resin A removed from the second oil (Comparative Example 6).

The adhesive force of the example of this invention, Example 6, was 17.0 kg/cm; the adhesive force of Comparative Example 6 was 10.4 kg/cm.

We claim:
1. A finish composition for polyester fiber to improve adhesion to rubber comprising a lubricant and
   (a) about 5 to 50 weight percent of an epoxy compound, and
   (b) about 3 to 30 weight percent of a novolak resin.
2. The composition of claim 1 wherein the lubricant is present in an amount of 20 to 70 weight percent.
3. The composition of claim 1 additionally comprising a surfactant.
4. The composition of claim 3 wherein the lubricant is present in an amount of 20 to 70 weight percent and the surfactant is present in an amount of 10 to 50 weight percent.
5. The composition of claim 4 wherein the epoxy compound is synthesized by the reaction of an epoxy compound containing a halogen with an alcohol or phenol.
6. The composition of claim 5 wherein the epoxy compound containing a halogen is epichlorohydrin.
7. The composition of claim 4 wherein the epoxy compound is selected from the group consisting of compounds having double bond oxidized with peracetic acid, the reaction product of epichlorohydrin with a polyhydric alcohol, and the reaction product of epichlorohydrin with a polyhydric phenol.
8. The composition of claim 4 wherein the novolak resin is the reaction product of resorcinol and the dimethylolated reaction product of formaldehyde with a phenolic compound, and wherein the degree of condensation is about 2-10.
9. The composition of claim 8 wherein the phenolic compound is phenol.
10. The composition of claim 8 wherein the phenolic compound is a ring substituted derivative of phenol.
11. The composition of claim 10 wherein the phenolic compound is selected from the group consisting of p-chlorophenol, p-bromophenol, and p-methylphenol.

* * * * *